UNITED STATES PATENT OFFICE.

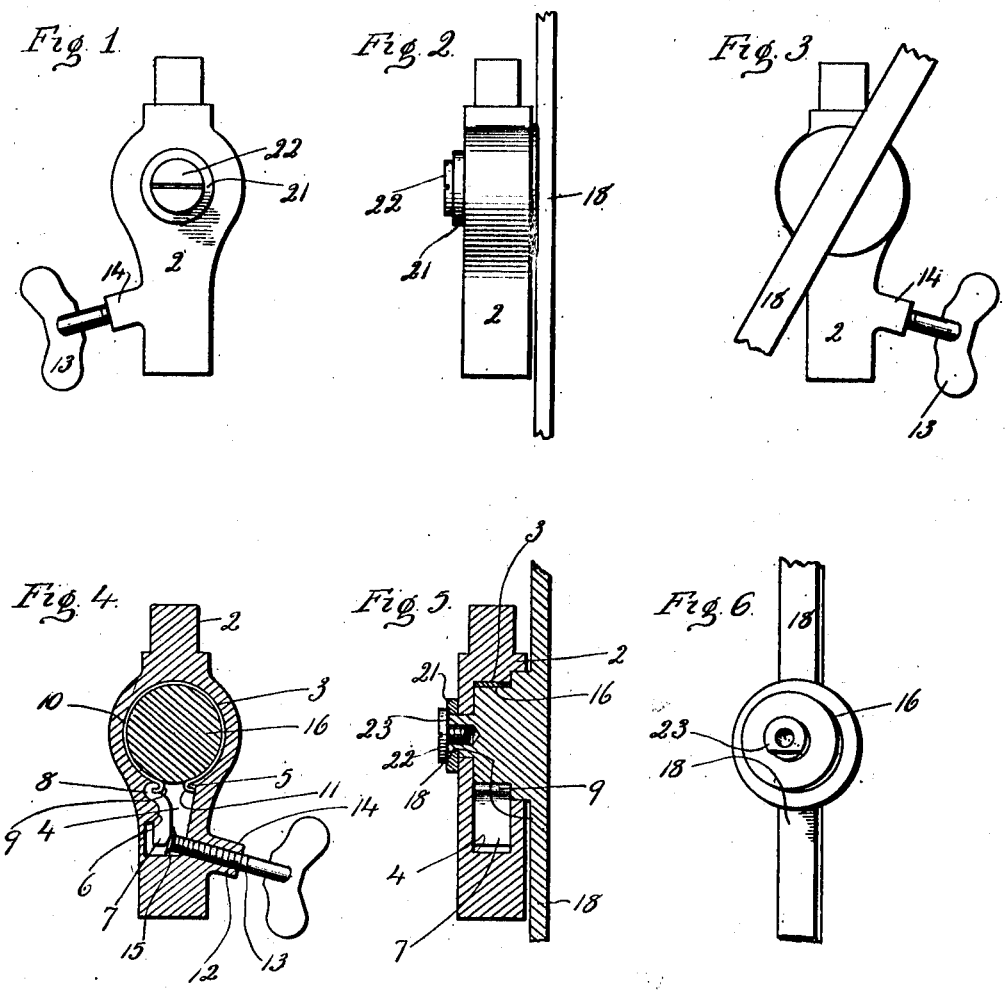

ALEXIS KRAH, OF NEW HAVEN, CONNECTICUT, ASSIGNOR TO THE ENGLISH & MERSICK CO., OF NEW HAVEN, CONNECTICUT, A CORPORATION.

LOCK-JOINT FOR WIND-SHIELDS.

1,031,275.   Specification of Letters Patent.   Patented July 2, 1912.

Application filed March 4, 1912. Serial No. 681,395.

*To all whom it may concern:*

Be it known that I, ALEXIS KRAH, a citizen of the United States, residing at New Haven, in the county of New Haven and State of Connecticut, have invented a new and useful Improvement in Lock-Joints for Wind-Shields; and I do hereby declare the following, when taken in connection with the accompanying drawings and the characters of reference marked thereon, to be a full, clear, and exact description of the same, and which said drawings constitute part of this application, and represent, in—

Figure 1 a rear view of a lock joint constructed in accordance with my invention. Fig. 2 a side view of the same. Fig. 3 a front view. Fig. 4 a rear view in vertical section. Fig. 5 a side view in vertical section. Fig. 6 a perspective view of the hub-member detached.

This invention relates to an improvement in lock-joints for wind shields, the object being to produce a joint which may be readily adjusted, and when adjusted firmly held in position; and the invention consists in the construction hereinafter described and particularly recited in the claims.

In carrying out my invention, I employ a stump or casing 2 which is the fixed member and mounted in the frame in any suitable way. In this stump is a circular chamber 3 and below the chamber and opening into it is a recess 4. At the upper end of one side of the recess is a slight projection 5 for the purpose as will hereinafter appear; and in the opposite side is an inwardly projecting lug or fulcrum 6. Within the recess and bearing on the fulcrum 6 is a lever 7 provided at its upper end with a hook 8 to be engaged by the hook-end 9 of a ring-like spring 10 which lines the chamber 3, so to speak, and has its other hook-end 11 engaged with the projection 5. Entered through one side of the casing and opening into the recess 4 is a threaded hole 12 into which is turned a thumb screw 13. As herein shown the casing is furnished with a supporting lug 14 to provide additional bearing for the screw. The inner end of the screw bears against the lower end of the lever 7 and preferably after the screw has been entered into the casing its inner end will be upset forming an enlargement 15 to prevent the entire removal of the screw. The complementary member consists of a hub 16 which carries a post 18 supporting the usual windshield. This hub is slightly smaller than the diameter of the recess 3 and so as to fit within the spring 10. Projecting forward from the hub is a lug 23 which extends through a hole 19 formed in the bottom wall of the chamber 3, and one side of the lug 23 is flattened as at 20 to receive a D-collar 21, and the hub is held in the casing by a screw 22. When the screw 13 is turned outward the spring is allowed to expand, and when expanded the hub 16 may be readily inserted into the chamber and secured in place and the hub will be free to turn to the desired point of adjustment. When adjusted the screw is turned inward against the lower end of the lever 7 which turning of the fulcrum 6 will move the upper end 8 of the lever toward the projection 5 and so contract the spring 10 and bind it upon the hub 16 with so much pressure as to lock the hub against movement.

I claim:—

1. A lock joint comprising a casing having a circular chamber and a recess opening out of said chamber, a hub located in said chamber, a lever in said recess, a spring surrounding the hub one end of the spring fixed to the casing, and the other engaged with said lever, and means for moving said lever whereby the spring is contracted.

2. A lock joint comprising a casing formed with a circular chamber and with a recess opening into said chamber, a projection at one side of said recess, and a fulcrum at the opposite side, a lever mounted in said recess and bearing on said fulcrum, a spring within said chamber, one end engaged with the said projection and the other with the upper end of said lever, a hub entered within said spring, and a screw entering said recess and bearing against the lower end of the said lever whereby the upper end may be moved and the spring contracted around said hub.

In testimony whereof, I have signed this specification in the presence of two subscribing witnesses.

ALEXIS KRAH.

Witnesses:
WILLIAM BRYAN,
W. A. EVANS.